US008686831B2

(12) United States Patent
Green et al.

(10) Patent No.: US 8,686,831 B2

(45) Date of Patent: Apr. 1, 2014

(54) MOBILE TOOL FACILITY

(75) Inventors: Michael Green, Delaware, OH (US); Kevin Hall, Westerville, OH (US)

(73) Assignee: Job Site Resources, LLC, Westerville, OH (US)

( * ) Notice: Subject to any disclaimer, the term of this patent is extended or adjusted under 35 U.S.C. 154(b) by 801 days.

(21) Appl. No.: 12/432,361

(22) Filed: Apr. 29, 2009

(65) Prior Publication Data

US 2010/0277277 A1 Nov. 4, 2010

(51) Int. Cl.

| | |
|---|---|
| ***B60R 25/00*** | (2013.01) |
| ***G05B 19/00*** | (2006.01) |
| ***G05B 23/00*** | (2006.01) |
| ***G06F 7/00*** | (2006.01) |
| ***G06F 7/04*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04Q 1/00*** | (2006.01) |
| ***H04Q 9/00*** | (2006.01) |

(52) U.S. Cl.

USPC ........... 340/5.72; 340/5.7; 340/5.8; 340/10.1; 340/10.52; 70/3; 70/271; 70/276; 70/278.1

(58) Field of Classification Search

USPC ........................................................ 340/5.72

See application file for complete search history.

(56) References Cited

U.S. PATENT DOCUMENTS

| | | | | |
|---|---|---|---|---|
| 6,406,249 | B1 * | 6/2002 | McAdams et al. | 414/800 |
| 6,492,957 | B2 * | 12/2002 | Carillo et al. | 343/841 |
| 7,086,558 | B1 | 8/2006 | Pixley et al. | |
| 7,317,393 | B2 * | 1/2008 | Maloney | 340/568.1 |
| 7,337,963 | B2 * | 3/2008 | Harper et al. | 235/385 |
| 7,371,977 | B1 * | 5/2008 | Preonas | 174/383 |
| 7,946,644 | B1 * | 5/2011 | Foster | 296/186.1 |
| 2001/0035410 | A1 * | 11/2001 | Taube et al. | 220/1.5 |
| 2002/0089434 | A1 * | 7/2002 | Ghazarian | 340/988 |
| 2005/0093690 | A1 | 5/2005 | Miglionico | |
| 2006/0103520 | A1 * | 5/2006 | Clark | 340/506 |
| 2006/0107614 | A1 * | 5/2006 | Slagel | 52/750 |
| 2006/0255934 | A1 * | 11/2006 | Easley et al. | 340/539.13 |

(Continued)

OTHER PUBLICATIONS

Autocrib, Inc., copies of AutoCrib Website Pages, http://www.autocrib.com/Intelliport, Apr. 27, 2009, 6 pages.

(Continued)

*Primary Examiner* — George Bugg

*Assistant Examiner* — Anthony D AfrifA-Kyei

(74) *Attorney, Agent, or Firm* — Taft Stettinius & Hollister, LLP; Stephen F. Rost

(57) ABSTRACT

A mobile tool facility is provided having a container configured to be moved to a plurality of locations. A portal system is positioned in an interior of the container and spaced from a container end allowing access to the portal system. The portal system is operable to control access into and out of the container. A radio frequency shield wall is positioned in the interior of the container and spaced from the portal system allowing access between the portal system and the shield wall. The shield wall is configured to reduce an amount of electromagnetic energy entering the interior of the container. An auxiliary power unit associated with the container is operable to provide power to the portal system. A plurality of items stored in the interior of the container in a controlled space is available to be removed from the container through the portal system by an authorized individual.

20 Claims, 11 Drawing Sheets

(56) References Cited

U.S. PATENT DOCUMENTS

| | | | | |
|---|---|---|---|---|
| 2007/0108273 | A1 | 5/2007 | Harper et al. | |
| 2007/0115127 | A1 | 5/2007 | Harper et al. | |
| 2007/0228692 | A1* | 10/2007 | Kern et al. | 280/403 |
| 2008/0100416 | A1 | 5/2008 | Harper et al. | |
| 2008/0164311 | A1 | 7/2008 | Harper et al. | |
| 2008/0165013 | A1 | 7/2008 | Harper et al. | |

OTHER PUBLICATIONS

Dropbox, Inc., copies of DropBox Website Pages, http://www.dropboxinc.com, Apr. 27, 2009, 4 pages.

Dropbox, Inc., copies of DropBox Website Pages, http://www.dropboxinc.com, 2 pages.

Stanley Black & Decker, Inc., copies of CribMaster Website Pages, http://cribmaster.com, Apr. 27, 2009, 3 pages.

U.S. Patent and Trademark Office; Office Action in U.S. Appl. No. 12/432,361 dated Nov. 30, 2011, 12 pages.

AutoCrib Website Pages, Apr. 27, 2009, 6 pages.

DropBox Website Pages, Apr. 27, 2009, 4 pages.

Drop Box Brochure from Website, 2 pages.

CribMaster Website pages, Apr. 27, 2009, 3 pages.

* cited by examiner

MOBILE TOOL FACILITY

FIELD OF THE INVENTION

The invention is generally related to monitoring and tracking objects and items, and more particularly, to systems, devices and methods for monitoring and tracking objects in a controlled space.

BACKGROUND OF THE INVENTION

Companies typically have difficulties tracking inventory items and their usage within their facilities. Many inventory items are misused, misplaced, and improperly tracked and replenished by the employees of the companies. Therefore, companies have incentives to track the items, hold employees responsible for missing items, properly account costs, and replenish the missing items based on demand. Typically items of the inventory are kept in a controlled space that is monitored. Some companies have used locking doors with keypads that allow only employees with authorized code to enter the controlled space. In addition, computers and bar code tags have been used to track the items in and out of the controlled space. However, these systems still lack tracking information, cost accounting information, security methods, and replenishments information in the process of tracking and monitoring the items stored in the controlled space and linking the responsible employee with the items being taken in and out of the controlled space.

The problem escalates when outside of a controlled environment such as a facility. Jobsite equipment theft is significant with industry loss estimates up to one billion dollars annually, according to a 2003 National Equipment Register study. Tool tracking and management systems provide one level of security, but a large percentage of theft includes tools disappearing from jobsites at the end of the workday. Some contemporary solutions to this problem include security portals designed for gate entrances and exits and activated by special electronic article surveillance ("EAS") security tags. Similar to retail environments, in practice, the portal sounds an alarm when an EAS tagged tool passes through it, alerting jobsite security and management to a problem. Portals are designed to attach to any fence or gate system for a secure entry and exit point. However, these solutions still lack the tracking and access control that is beneficial on a jobsite with combinations of employees and contractors, as well as ease and portability of the secured area.

Therefore there is a need in the art for a system, apparatus and method that monitors and tracks items stored in a controlled space, which is conveniently portable for jobsites.

SUMMARY OF THE INVENTION

Embodiments of the invention provide a mobile tool facility including a container, which is configured to be moved to a plurality of locations. The container includes an interior for storing a plurality of items and an end, which provides access to the interior. A portal system is positioned in and rigidly coupled with a bottom surface of the interior of the container. The portal system is spaced from the container end to allow access to the portal system. The portal system controls access into and out of the container. A radio frequency shield wall is positioned in the interior of the container and spaced from the portal system in order to allow access between the portal system and the shield wall. The shield wall is configured to reduce an amount of electromagnetic energy entering the interior of the container storing the plurality of items. An auxiliary power unit (APU) is associated with the container and provides power to both the portal system and container. The plurality of items stored in the interior of the container is in a controlled space defined by the shield wall and interior walls of the container. The items are available to be removed from the container through the portal system by an authorized individual.

In order to retrieve an item from a mobile tool facility, a user enters a controlled access area of the container storing the plurality of items. The user enters user access information to the portal system positioned in the container. In response to access being granted to a user, the user enters the interior of the container through the portal system to retrieve at least one item of the plurality of items. The user then exits the interior of the container through the portal system with the at least one item. The portal system automatically reads data from an RFID data tag associated with any of the items retrieved by the user and associates the item(s) with the user.

When a user returns an item to a mobile tool facility, the user enters the controlled access area of the container. The user enters user access information to the portal system positioned in the container. In response to access being granted to the user, the user enters the interior of the container through the portal system to return the item. At the portal system, data is automatically read from the RFID data tag associated with the item. The item is disassociated from the user by the portal system. The user then exits the interior of the container through the portal system.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 3:
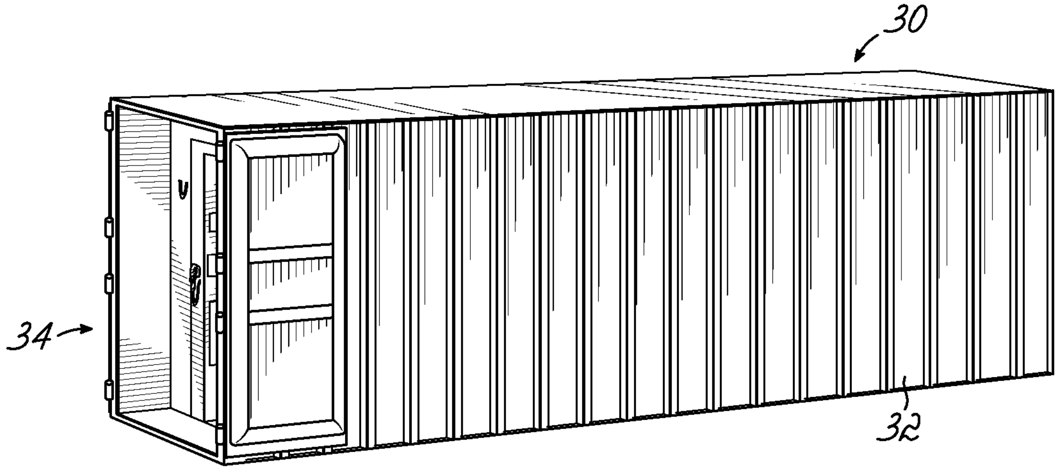
FIG. 3 an isometric view of another exemplary mobile tool facility implemented in a standard container box.

Embodiments of the invention provide a mobile tool facility that utilizes radio frequency identification ("RFID") with a security portal system. The security portal system provides a controlled access point to the mobile tool facility. As seen generally in FIG. 1, a mobile tool facility 20 may be implemented in a trailer 22, such as a standard 53 foot trailer, though other sized trailers may also be used depending on the space requirements needed for the controlled access. Smaller controlled spaces may be implemented in trailers of lengths 28-48 feet, while other spaces may require spaces exceeding a standard 53 foot trailer. In these latter instances and as seen in FIG. 2, multiple trailers 22, 24 may be parked next to one another, with an access 26 between the trailers as seen in FIG. 2. Here the first trailer 22 provides the controlled access point 28 and part of the controlled area, while the second trailer 24 provides additional space and is accessible only through the first trailer 22 via access point 26. If necessary, additional trailers may also be used. A mobile tool facility 30 may also be implemented in a standard 20 or 40 foot container box 32 as seen in FIG. 3. Similar to the embodiments 20, 20*a* implemented in the semi-trailer 22, the container embodiment 30 may utilize multiple containers depending on the requirements of the controlled space needed. Also similar to the semi-trailer embodiments 20, 20*a*, access to the controlled space is through a controlled access point 34. It is further contemplated that the mobile tool facility can be implemented in any mobile or temporary structure that can be easily moved from one location to another, and is not limited only to the semi-trailers or containers above.

Figure 1:
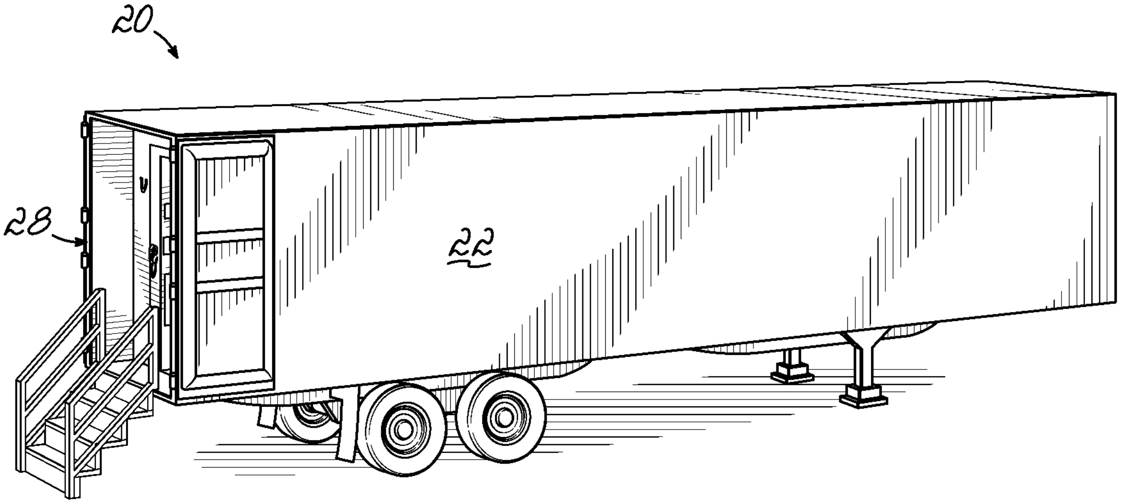
FIG. 1 is an isometric view of an exemplary mobile tool facility implemented in a standard semi-trailer.
Figure 2:
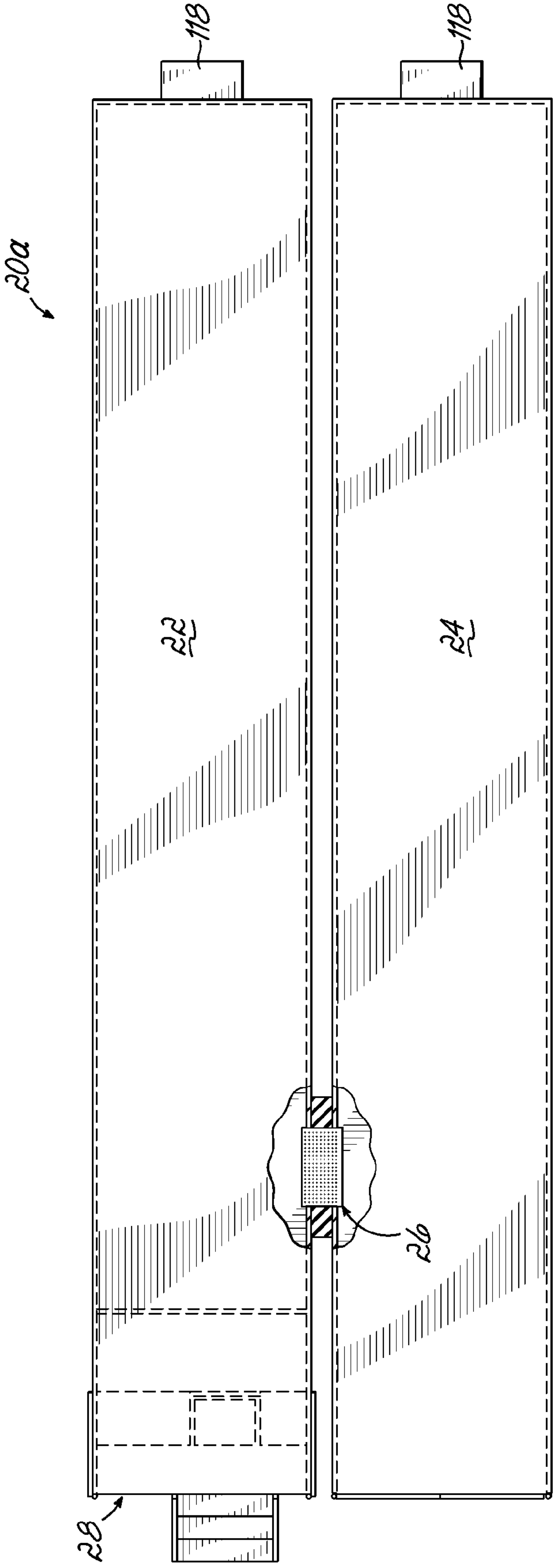
FIG. 2 is a top view of another exemplary mobile tool facility implemented in two interconnected semi-trailers.

In general operation of any of the implementations in FIGS. 1-3, as an employee or contractor steps into a gated mobile security portal located at the rear of the mobile tool facility, a video surveillance system captures and stores an image. The system may then validate the employee's or contractor's user access information by reading their RFID identification card or key fob. Once the user access information is verified, the employee or contractor is granted authorization. An electromagnetic lock on an access door then disengages, permitting the employee or contractor to advance into the secured mobile tool facility and obtain the required item(s) from stock.

As the employee or contractor exits, the video cameras mounted on the portal captures an image of the employee with the items. The RFID reader system identifies the RFID tags that have been affixed or embedded within each item. A software system then updates the required inventory and employee records. The items are issued to and associated with the employee or contractor and adjustments are made to inventory levels to account for transactions. Each of these components along with additional optional security features are set out in more detail below.

Figure 4:
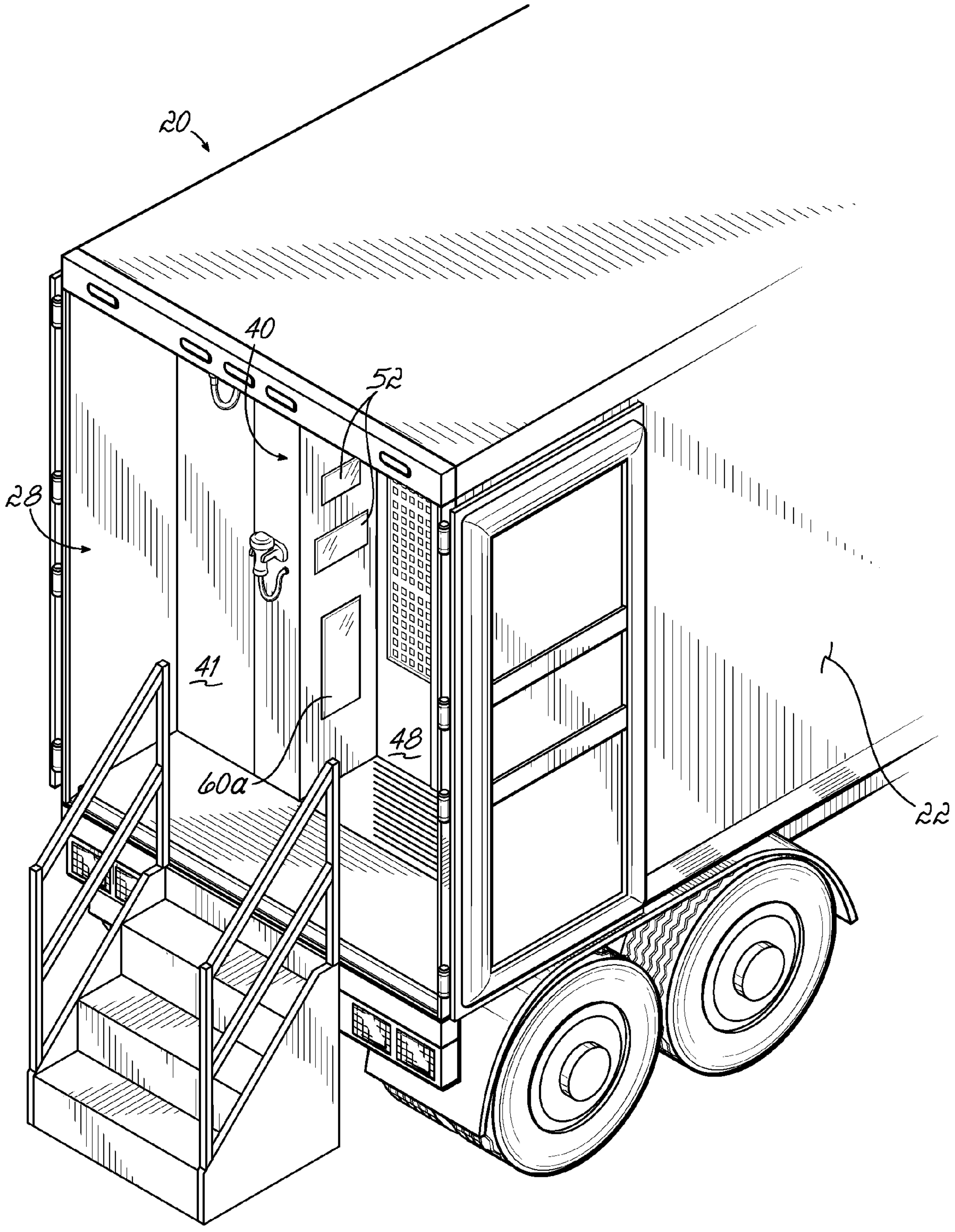
FIG. 4 is a detailed view of a controlled access point of the mobile tool facility of FIG. 1.

Referring now to FIG. 1 and FIG. 4 and in some embodiments, the controlled access point 28 for the mobile tool facility is located at the rear of the semi-trailer. The location of the controlled access point for the mobile tool facility is arbitrary and may be located anywhere on the semi-trailer 22 or container 32. Many standard semi-trailers contain doors at the rear of the trailer for access into the trailer, making this location a logical selection for placement of a RFID portal system 40 to control access. This location may also require less surrounding structure 41 and maximize the remaining available space for inventory storage. One of ordinary skill in the art will realize that other locations for other trailers may be more appropriate based on the layout of the particular trailer. Regardless of the location of the controlled access point 28, the number of access points should be limited for easier accounting and tracking of the inventory items in the mobile tool facility.

Figure 5A:
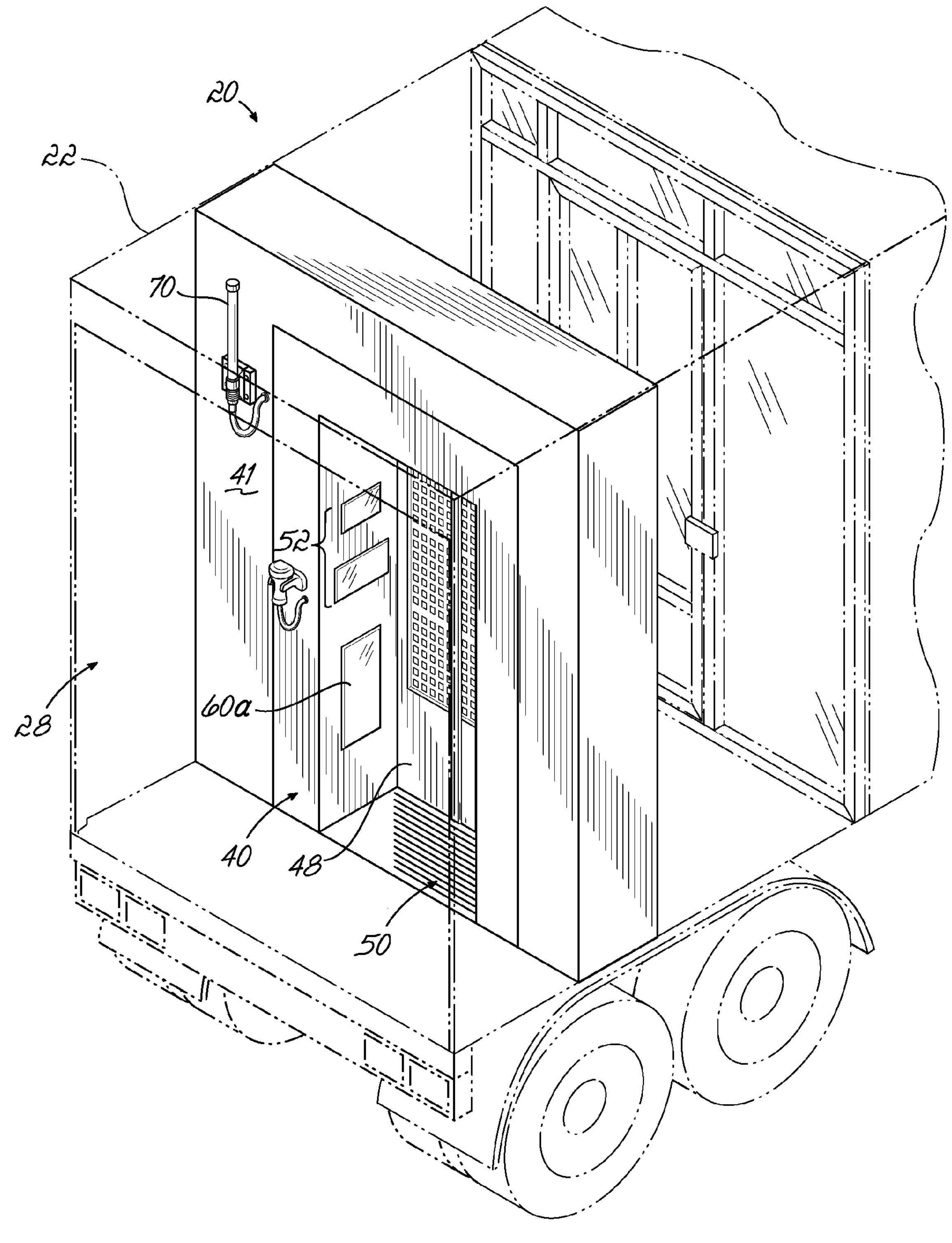
FIG. 5A is a detailed view of the access control point of FIG. 4 showing an access portal.

Embodiments of the controlled access point 28 utilize a portal system 40 for controlling access to the mobile tool facility. Details of the portal system may be seen in FIGS. 5A and 5B. As set forth above, the portal system 40 may be placed near the rear doors of the semi-trailer 22 in order to allow access into the trailer. In order to keep the controlled space of the trailer secure, surrounding structure 41 may need to be erected around the portal system 40 to fill any gaps between the portal system 40 and the inner surfaces of the semi-trailer 22, which could be used as access area by unauthorized personnel. Further, due to the construction of the portal systems, the systems tend to be top heavy, having a high center of gravity. Therefore, for added stability, especially during transportation of the mobile tool facility, the portal system may be rigidly coupled with the bottom surface of the interior of the container. In some embodiments, the bottom of the container may be reinforced to added support.

Figure 5B:
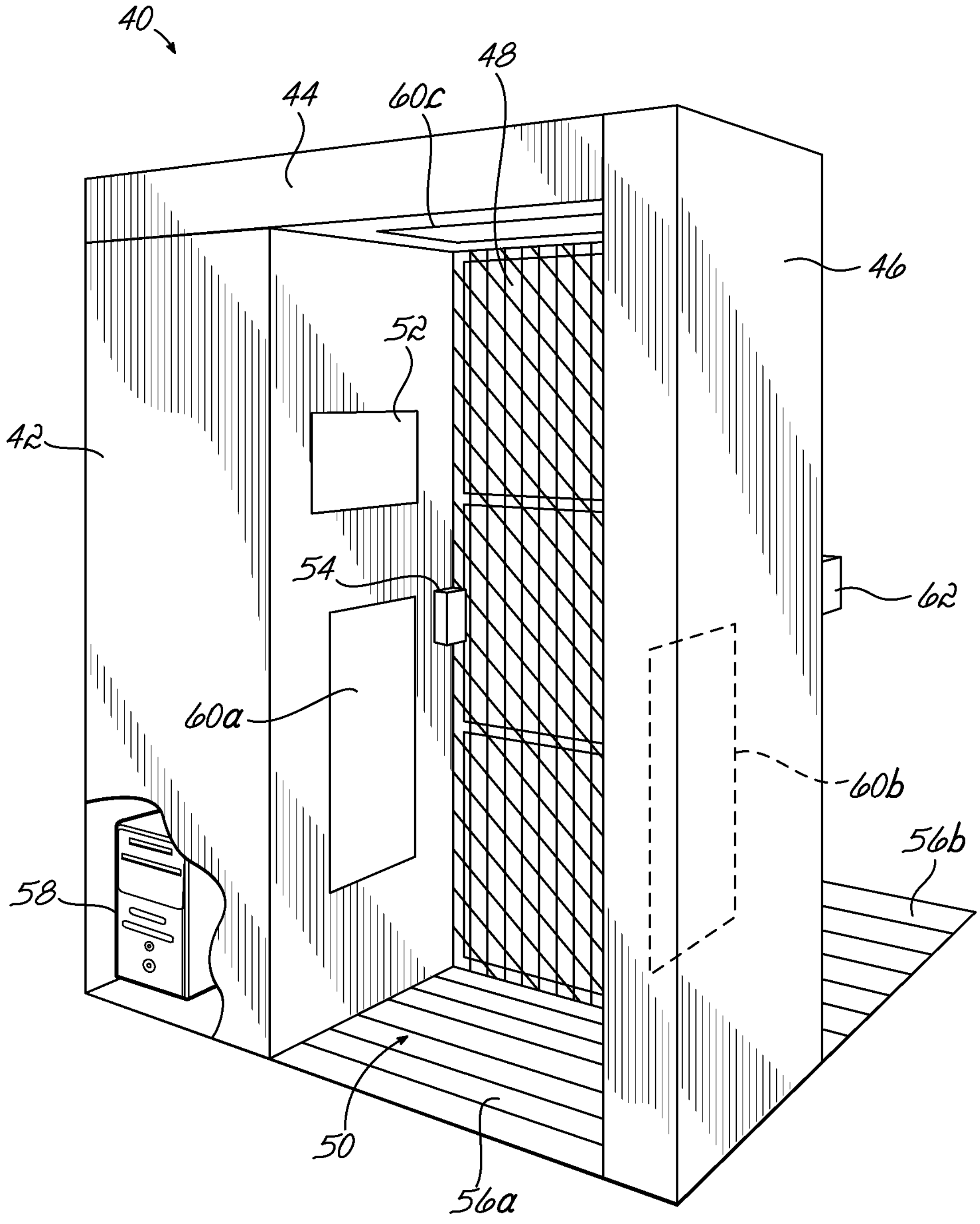
FIG. 5B is a detailed view of an RF portal utilized in the access control point of FIG. 5A.

A portal system that may be used for the controlled access point 28 may be a CribMaster Accu-Port™ produced by WinWare, Inc. of Marietta, Ga. and described in U.S. application Ser. No. 11/969,350, the disclosure of which is incorporated by reference herein in its entirety. This portal system is designed to track and monitor items in a controlled space. As best seen in FIG. 5B, the portal system 40 includes a left section 42, a top section 44, and a right section 46. The ends of the top section 44 are fixedly coupled to the top ends of the left and right sections 42, 46.

The portal system 40 is coupled to a locking door 48, typically between the portal system 40 and the controlled space. The locking door 48 assists in preventing an unauthorized employee or a contractor from entering and exiting the controlled space. The portal system 40 forms a portal area 50 that the employees and contractors may enter to interact with the portal system 40 to unlock the locking door 48. The portal area 50 is typically between the left section 42 and right section 46 of the portal system 40. The portal area 50 is an area where the portal system 40 generally receives data from the employee or contractor, either wirelessly via a radio frequency identification card or key fob, or mechanically via a graphical user interface 52.

The portal system 40 includes an electromagnetic lock 54 that may be fixedly coupled to the back of the left section 42 of the portal system 40 to engage the locking door 48 such that the lock 54 may lock or unlock the locking door 48. One of ordinary skill in the art will recognize that the electromagnetic lock 54 may be fixedly coupled anywhere on the portal system 40 so long that the electromagnetic lock 54 engages the locking door 48.

In some embodiments, the portal system 40 may include one or more presence sensing mats 56*a*, 56*b* that are placed at or near the portal area 50. One presence sensing mat 56*a* may be fixedly coupled to the floor between the left section 42 and right section 46 of the portal system 40. A second presence sensing mat 56*b* may be fixedly coupled to the floor behind the locking door 48 and in the controlled space. The presence sensing mats 56*a*, 56*b* may assist in determining whether an employee or contractor and inventory are entering or exiting the controlled space. For example, when an employee or contractor enters the controlled space, the presence sensing mat 56*a* on the floor between sections 42, 46 detects the user entering the portal area 50. When the employee or contractor is verified by the portal system 40 that the employee or contractor is authorized to enter, the presence sensing mat 56*b* located behind the locking door 48 and in the controlled space verifies that the employee or contractor has entered the controlled space. When the employee or contractor exits the controlled space, the presence sensing mat 56*a* located between the sections 42, 46 of the portal system 40 detects the user exiting the controlled space and verifies that the user has exited the portal area 50 of the portal system 40 and out of the controlled space. One of ordinary skill in the art will realize that the presence sensing mats are just one of a number of solutions to detecting the presence of an employee or contractor in the portal area 50 or controlled space.

The left section 42 of the portal system houses a computing device 58, RF antenna 60*a*, and the user graphical interface 52. The computing device 58 is located inside the left section 42 of the portal system 40. The antenna 60*a* and user interface 52 are fixedly coupled on the right of the section 42. The right section 46 of the portal system 40 includes antenna 60*b* that is fixedly coupled on the left of the section 46 and an unlock button 62 that is fixedly coupled on the back of the section and used to unlock the locking door 48 when the employee or contractor wishes to leave the controlled area.

The top section 44 of the portal system may also include an antenna 60*c* that is fixedly coupled to the bottom of the top section 44. The antennas 60*a-c*, presence sensing mats 56*a-b*, and the user interface 52 are positioned in the portal area 50 so that the employee or contractor can interact with these components as the employee or contractor enters the portal system. The portal area 50 is the area that the antennas 60*a-c* and presence sensing mat 56*a* may detect the employee or contractor and radio frequency tags associated with each of the inventory items, typically between the left section 42 and right section 46 of the portal system 40.

Figure 5C:
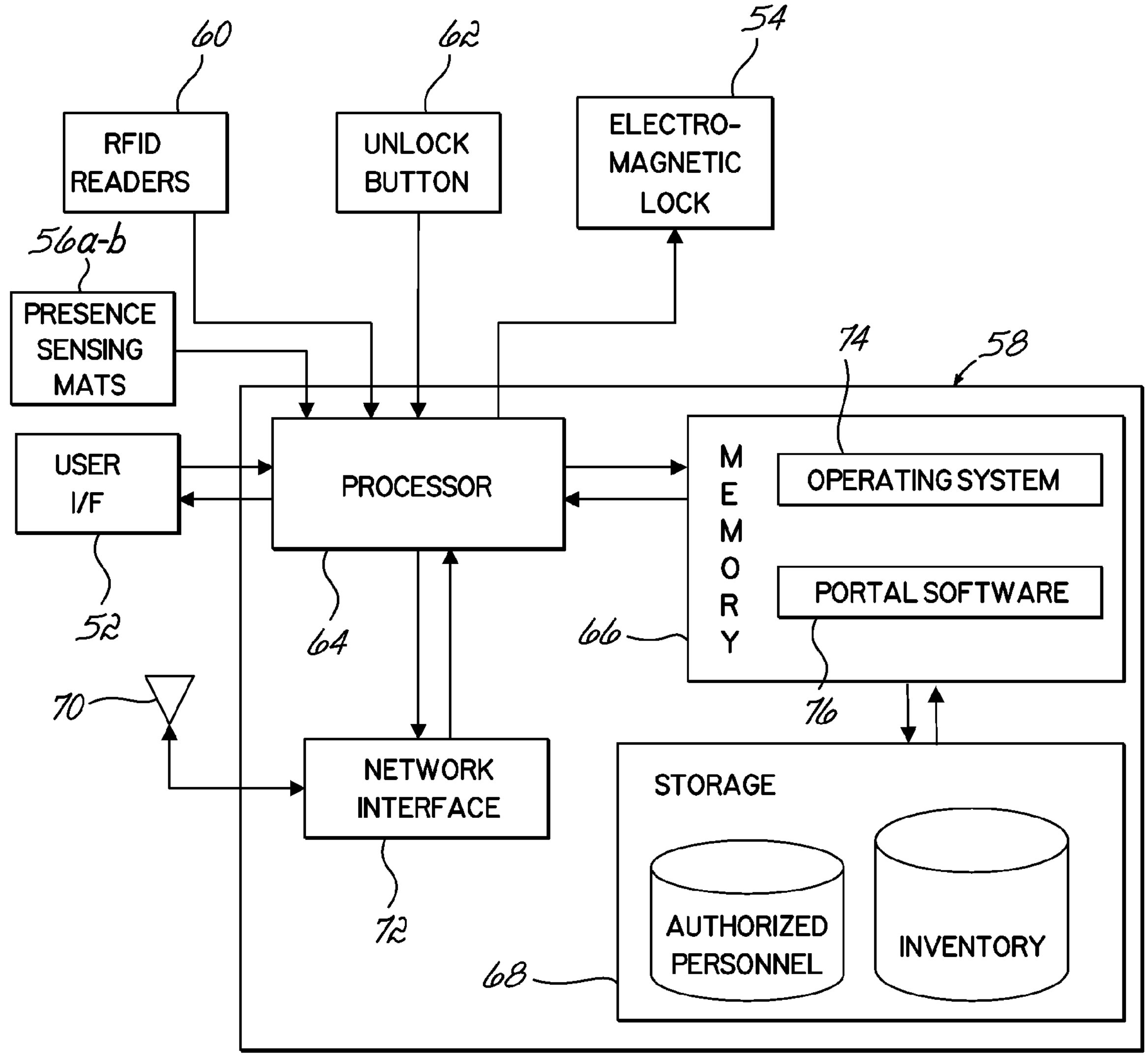
FIG. 5C is a block diagram of an exemplary hardware and software environment for the RF portal in FIG. 5B.

Computing device 58, as seen in FIG. 5C, typically includes at least one processor 64 coupled to a memory 66. Processor 64 may represent one or more processors (e.g. microprocessors), and memory 66 may represent the random access memory (RAM) devices comprising the main storage of computing device 58, as well as any supplemental levels of memory, e.g., cache memories, non-volatile or backup memories (e.g. programmable or flash memories), read-only memories, etc. In addition, memory 66 may be considered to include memory storage physically located elsewhere in computing device 58, e.g., any cache memory in a processor 64, as well as any storage capacity used as a virtual memory, e.g., as stored on a mass storage device 68. The mass storage device 68 may contain one or more databases with information related to personnel with authorized access to the controlled area as well as inventory both in the controlled area and assigned to authorized personnel.

Computing device 58 also typically receives a number of inputs and outputs for communicating information externally. For interface with a user or operator, computing device 58 typically includes one or more user interface devices 52, such as input devices (e.g., a keyboard, a mouse, a trackball, a joystick, a touchpad, a keypad, a stylus, and/or a microphone, among others). Interface devices 52 may also include a display or other output device (e.g., a CRT monitor, an LCD display panel, and/or a speaker, among others). Additional inputs and outputs for the portal system 40 may also include RFID readers 60 using RF antennas 60*a-c*, presence sensing mats 56*a-b*, the unlock button 62, and the electromagnetic lock 54. Computing device 58 may also communicate on a wireless network 70 through a network interface 72.

Computing device 58 operates under the control of an operating system 74, and executes or otherwise relies upon various computer software applications, components, programs, objects, modules, data structures, etc. (e.g. portal software 76). Under control of the operating system 74 and portal software 76 the processor 64 allow/deny access to the controlled space by engaging or disengaging the electro-magnetic lock 54, detect the presence of an employee or contractor on a presence sensing mat 56*a-b*, read RF data from either an RFID Identification card or key fob or data from RFID tags on inventory items with the RFID readers 60, or interact with the graphical user interface 52.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 5C is not intended to limit the present invention. Indeed, those skilled in the art will recognize that other alternative hardware and/or software environments may be used without departing from the scope of the invention. Those skilled in the art will also appreciate that the physical requirements of the computing environment may require additional structural support and vibration tolerance due the mounting of the portal system in a mobile trailer as in FIG. 1 or container as in FIG. 3. The mobility of the tool facility may introduce additional shock and vibration type loads not experienced by similar non-mobile configurations.

Figure 6A:
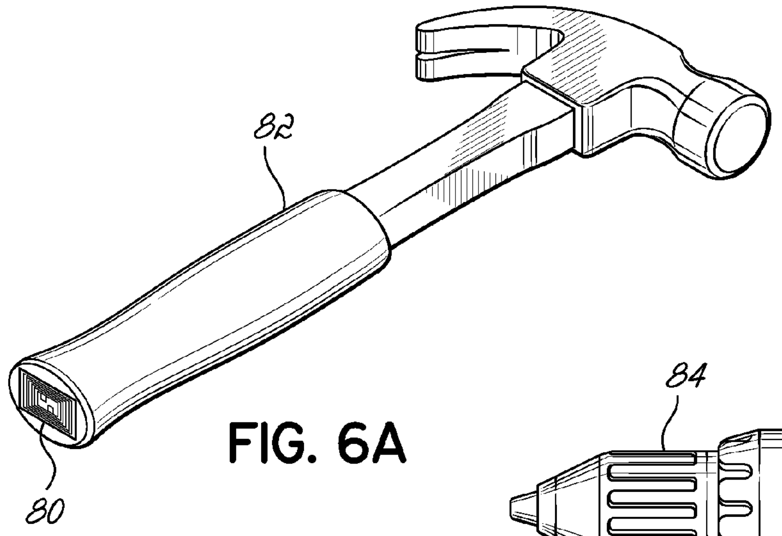
FIG. 6A illustrates an exemplary item with an RFID data tag.
Figure 6B:
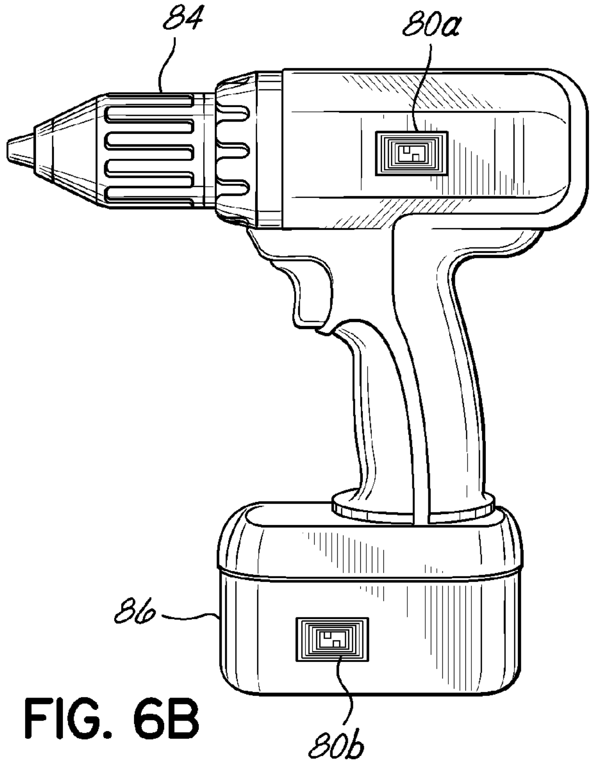
FIG. 6B illustrates an exemplary item with two RFID data tags.

Inventory stored in the mobile tool facility 20 is tracked and assigned to users with authorized access via data stored on an RFID data tag. These data tags are incorporated into or onto the inventory items such as illustrated in FIGS. 6A and 6B. Generally the RFID data tag 80 will be incorporated in or on the item being tracked by the portal system 40. For example the hammer 82 in FIG. 6A may have the RFID data tag 80 incorporated into the handle, or other location. Items such as the cordless drill 84 in FIG. 6B may utilized two RFID data tags 80*a*, 80*b*. One of the data tags 80*a* may be associated with the cordless drill 84 itself, while the second data tag 80*b* may be associated with the battery 86 for the cordless drill since the two components can be separated. This may also facilitate tracking the replacement of the battery 86 for the cordless drill 84. Items such as cords may have the RFID data tag 80 embedded in an end or wrapped around the cord such that it would be difficult to remove. Items that are contained in bags, may have the RFID data tag 80 incorporated into the bag. Tags 80 may be incorporated anywhere on the object that would facilitate reading of the data as well as inhibit removal of the tag.

Figure 7A:
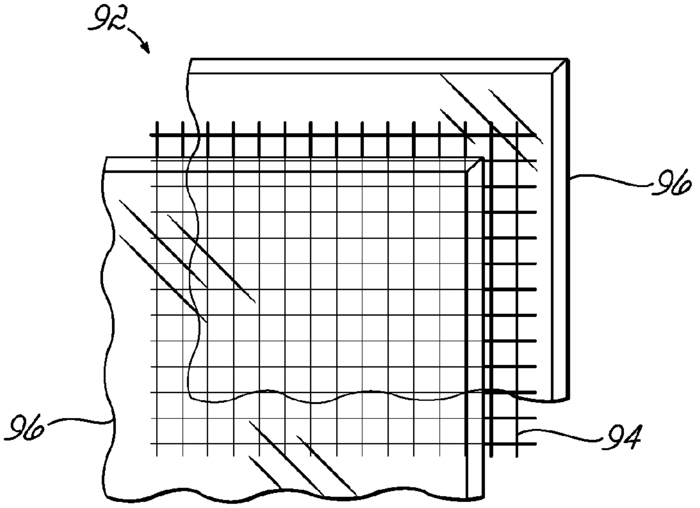
FIG. 7A is a detailed portion of the shield wall in FIG. 7.
Figure 7:
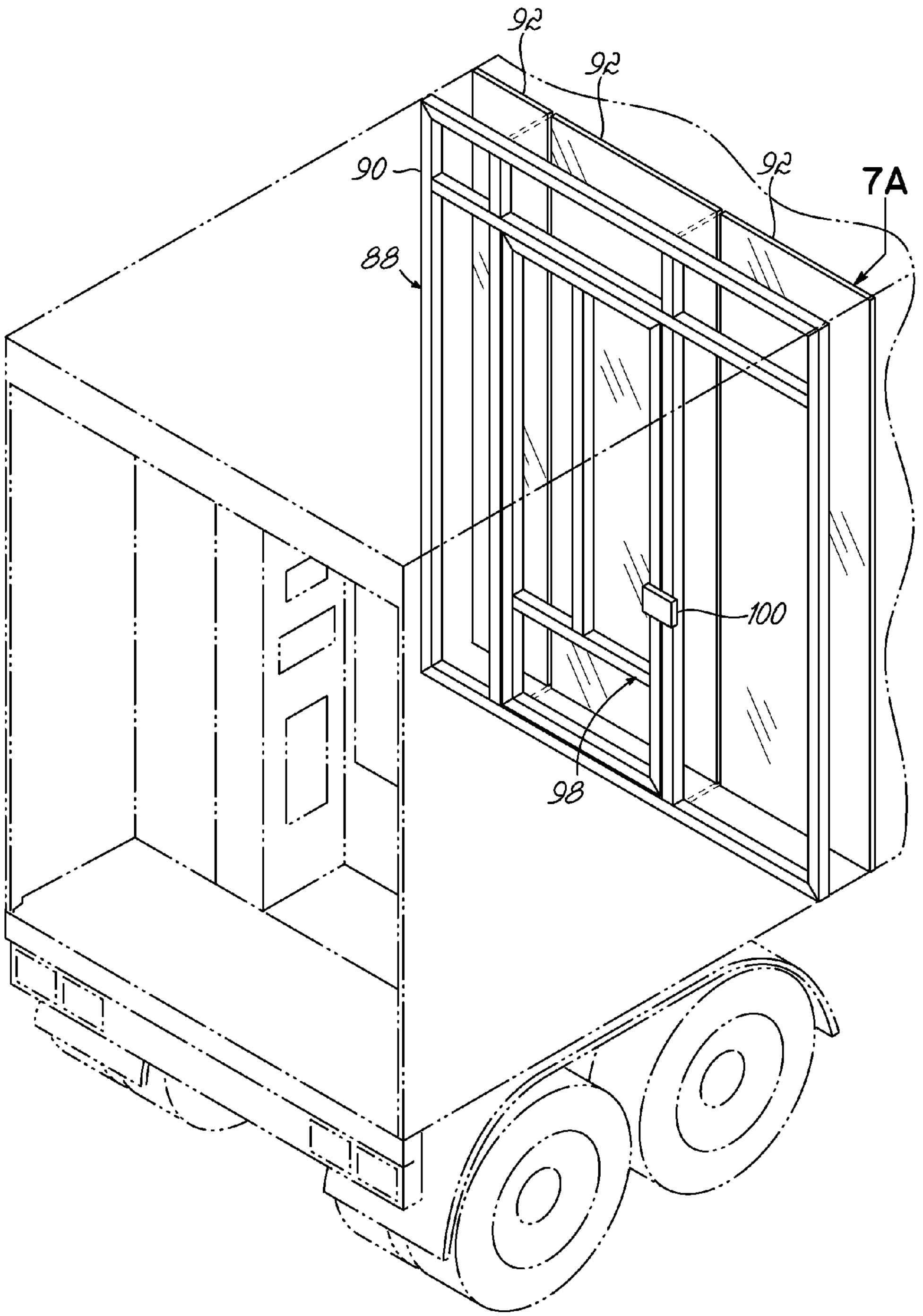
FIG. 7 is an isometric view of an RF shield wall used in the mobile tool facility of FIG. 1.

To avoid inadvertent reads from the data tags 80 by the portal system 40, a shield may be constructed between the portal system 40 and the storage area for the items as illustrated in FIG. 7. The shielding assists in reducing the coupling of radio waves, electromagnetic fields and electrostatic fields, though not static or low-frequency magnetic fields. The amount of reduction depends very much upon the material used, its thickness, the size of the shielded volume and the frequency of the fields of interest and the size, shape and orientation of apertures in a shield to an incident electromagnetic field.

Shielding may be accomplished using any number of methods known to one of ordinary skill in the art. For example, a Faraday cage or Faraday shield may be used. A Faraday cage is an enclosure formed by conducting material, or by a mesh of such material. Such an enclosure blocks out external static electrical fields. To a large degree, Faraday cages also shield the interior from external electromagnetic radiation if the conductor is thick enough and any holes are significantly smaller than the radiation's wavelength. For example, certain computer forensic test procedures of electronic components or systems that require an environment devoid of electromagnetic interference may be conducted within a so-called screen room. These screen rooms are essentially labs or work areas that are completely enclosed by one or more layers of fine metal mesh or perforated sheet metal. The metal layers are connected to earth ground to dissipate any electric currents generated from the external electromagnetic fields, and thus block a large amount of the electromagnetic interference.

Depending on the construction of the trailer 20 or container 30, the trailer 20 or container 30 may form the bulk of the Faraday cage requiring the addition of only a single shield wall 88. In other embodiments for other constructions, only the single shield wall 88, rather than an entire Faraday cage may be sufficient as illustrated in FIG. 7. Regardless of the configuration, the wall may be framed using any suitable material such as one-inch metal box tubing 90. Each of the shield panels 92, a disassembled portion of which is illustrated in the detailed FIG. 7A, may include an aluminum screening 94 inserted between two pieces of ⅛ inch LEXAN® sheeting 96. Other materials such as steel may be used for the screening as long as the material is capable of blocking electromagnetic transmission. Additionally, materials other than LEXAN® may be used, though LEXAN® allows an authorized individual the ability to see into and out of the storage area and has good structural properties.

Access through the shield wall 88 is through door 98. In some embodiments, the door 98 has an electromagnetic locking mechanism 100 and a pneumatic self closure (not shown). The electromagnetic locking mechanism 100 may be wired to a relay system in the RF Portal System 40. The relay system may control the locking system on both the portal door 48 and the shield door 98. The relay system may disengage one door 48, 98 at a time to reduce RFID reader errors and to assist in controlling traffic patterns in and out of the mobile tool facility.

Figure 8:
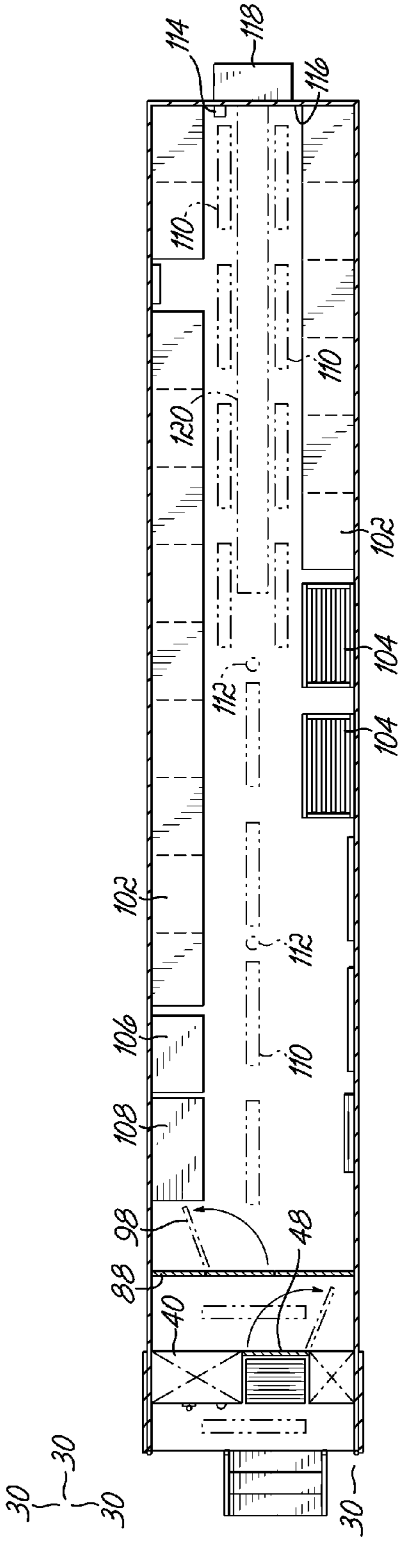
FIG. 8 is a top view of the mobile tool facility of FIG. 1.
Figure 9:
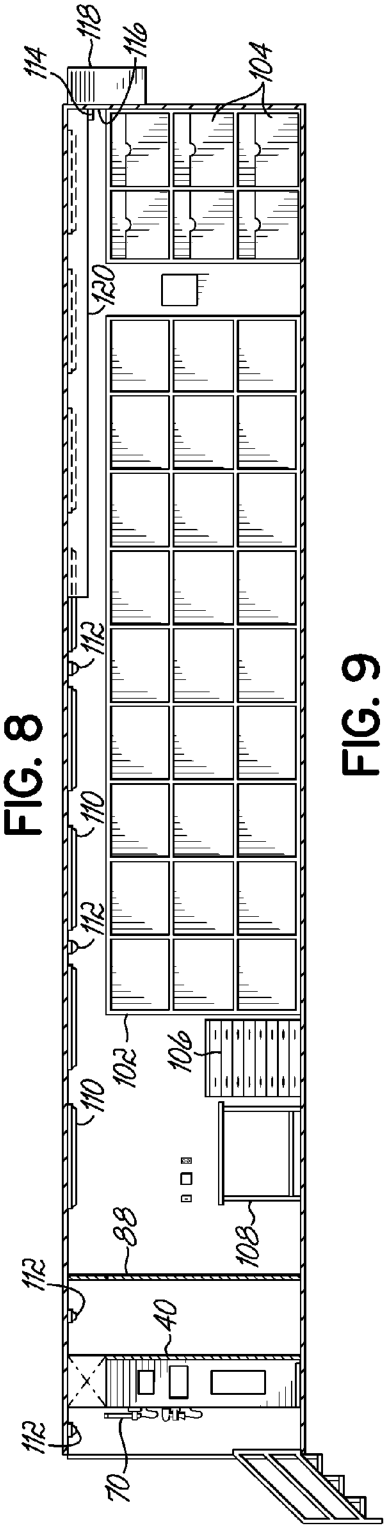
FIG. 9 is a side view of the mobile tool facility of FIG. 1
Figure 10:
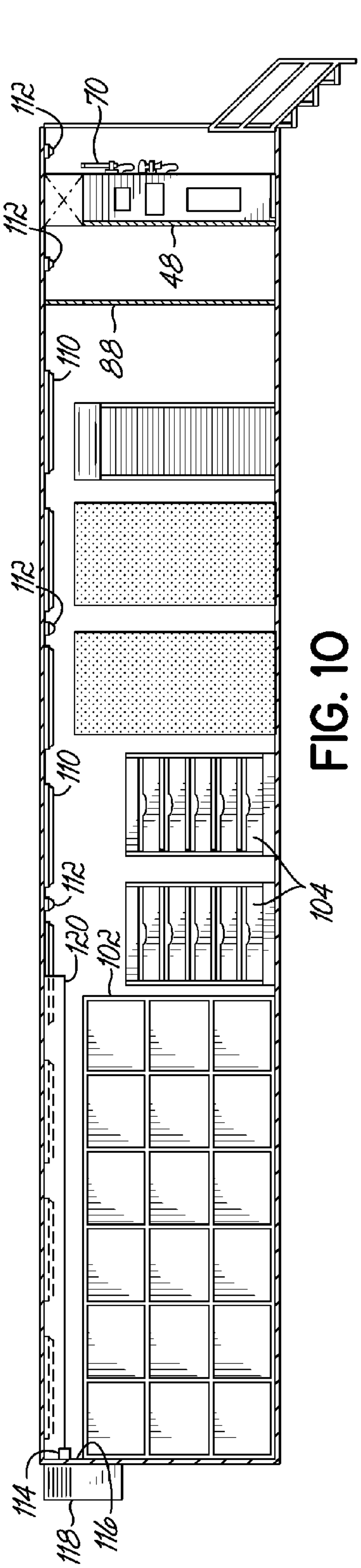
FIG. 10 is an alternate side view of the mobile tool facility of FIG. 1.

Once inside the storage area, and as illustrated in an exemplary embodiment in FIGS. 8-10 items, such as the hammer 82 and cordless drill 84, may be placed on shelving units 102, in storage bins 104, or in drawers 106. The storage area may include a table 108 used to collect or assemble items taken from the shelves 102, bins 104, or drawers 106. Each area may be clearly labeled or otherwise marked to facilitate finding and returning the equipment to the storage area. The storage area is illuminated by light fixtures 110 such as florescent fixtures.

As added security, in some embodiments, dome cameras 112 and box cameras 114 may be implemented so entry into and out of the mobile tool facility as well as activities within the mobile tool facility may be monitored. The dome cameras 112 may be mounted on the portal system 40 and the mobile tool facility ceiling to provide surveillance throughout the facility. Dome cameras 112 may include a rugged, dust proof dome encasing and protecting the camera from the environment. The box camera 114 may be mounted on an interior back wall 116 of the mobile tool facility. The box camera 114 may capture authorized user activity as they travel down the aisle and remove items from the shelving 102, bins 104 or drawers 106. The box camera 114 may include a durable metal casing in order to protect the camera from the environment.

The dome 112 and box 114 cameras may be configured to produce high resolution color pictures. The cameras may be set up such that the cameras 112,114 can pan, tilt, and/or zoom. The cameras 112, 114 may follow a predetermined motion pattern, or in other embodiments the cameras may be digitally remote controlled over a wired or wireless network. In addition to capturing and storing still images, the cameras may also capture streaming pictures to generate movie type files such as MPEG. Some of the cameras 112, 114 may work in conjunction with a motion sensor such that the camera only records images when motion is detected.

In some embodiments, an audible alarm may be activated when a tamper switch mounted on the portal door 48 remains disengaged for a period of time exceeding the time interval threshold set for the door to be open. Once activated, an electronic notification may be sent to the authorities as defined by a system administrator. Additionally or alternatively, in some embodiments, an e-mail alert may be sent and a log entry made when an alarm is sounded. Administrators or owners of the mobile tool facility may then be able to access the camera system using a web-based remote access over the internet using a web browser. Due to the mobile nature of the mobile tool facility, network connections may likely be wireless connections utilizing wireless network 70. In some embodiments, the mobile tool facility may be able to support a wired connection for network access.

The mobile tool facility may be powered using a standard APU mounted on the trailer 20 or container 30 embodiments. The APU should provide sufficient power to accommodate the power needs of the portal system 40, related computer and networking equipment, lighting, and electromagnetic locking devices. Additionally the APU should be able to supply power to an HVAC system 118 which controls the climate of the storage area in the mobile tool facility. Ducts 120 facilitate moving the heated or cooled air around the storage space. An APU suitable for use with an embodiment of the mobile tool facility 20, is a standard trailer mounted 60 kW generator, model G21 manufactured by Aggreko North America L.L.C. of Houston, Tex.

Figure 11:
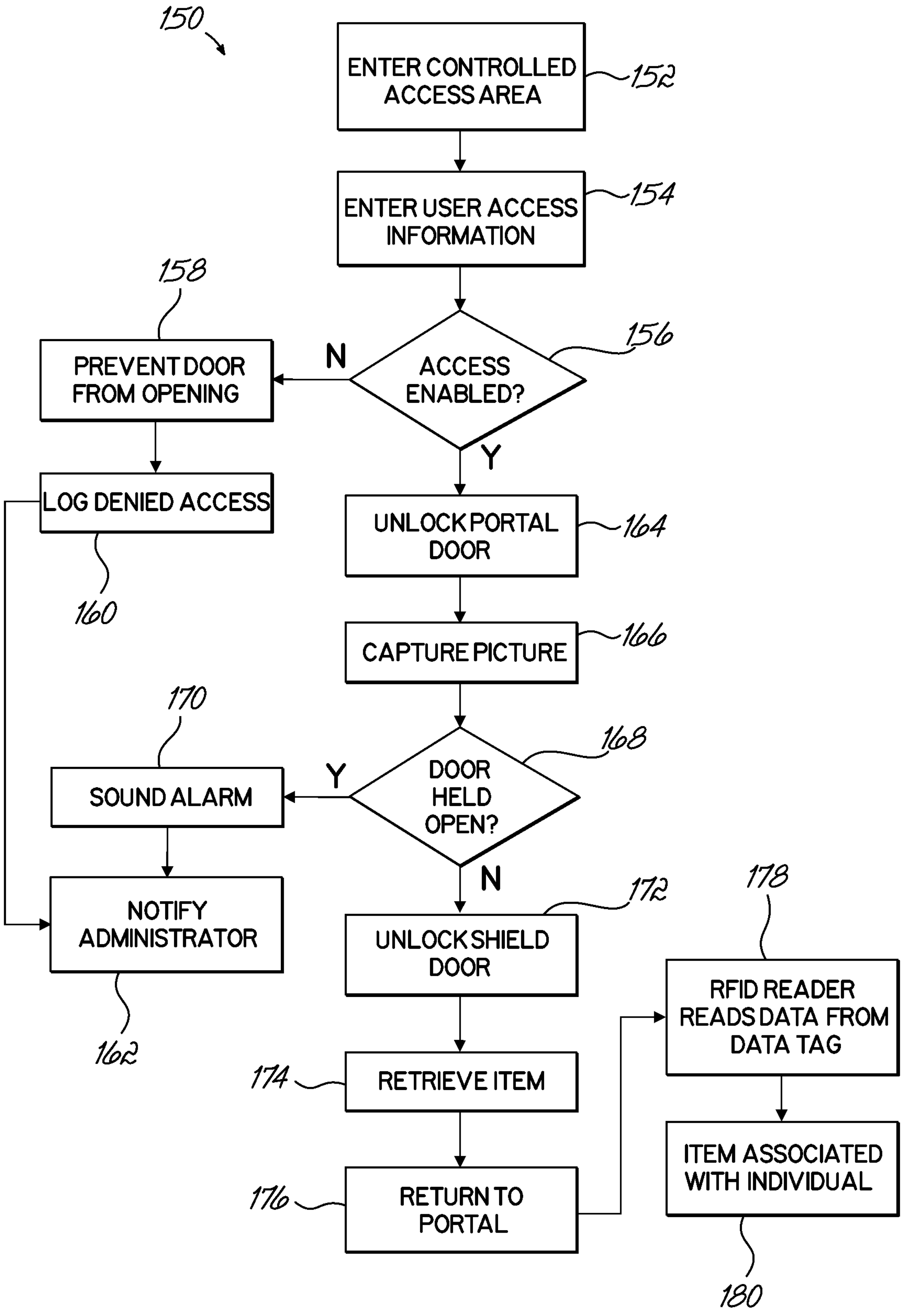
FIG. 11 is a flowchart illustrating an exemplary process of retrieving a tool from the mobile tool facility of FIG. 1.

After the mobile tool facility has been delivered to the job location and is under power, the employees and contractors may use the facility to retrieve tools and other items. Flowchart 150 in FIG. 11 illustrates an exemplary process for retrieving an item from the mobile tool facility. An employee or authorized contractor enters the controlled access area at the rear of the trailer or container housing the facility and approaches the RFID portal system (block 152). The employee or authorized contractor enters user information (block 154). This may be accomplished using various methods. For example, the employee or contractor may enter a user ID and password on the console in order to gain access. In other embodiments, the employee or contractor may have a badge with an RFID tag including the user ID and password information. In this embodiment, the RF Reader in the portal may automatically retrieve the information from the badge to check for access authority. One of ordinary skill in the art will appreciated that other methods of supplying user access information may also be used. If the employee or contractor is denied access ("No" branch of decision block 156), then the portal system prevents the door from opening. (block 158). The denied access with user name may be logged in a system log (block 160) and in some embodiments, an administrator may be informed that there was a denial of access (block 162). If access has been granted ("Yes" branch of decision block 156), the portal door is unlocked (block 164). As the employee or authorized contractor passes through the portal, a video surveillance system may capture and archive an image of the employee to establish time stamped visual documentation (block 166).

As the authorized employee or authorized contractor enters, an audible command is triggered to notify the employee or contractor to close the door. If the door is left disengaged or propped open ("Yes" branch of decision block 168), an audible alarm will be activated (block 170) and an electronic notification will be sent to management informing them of the door status (block 162). The door security system assists in preventing unauthorized entry into the mobile tool facility, which may ultimately yield an increase in inventory accuracy and a reduced opportunity of theft. After a time delay, the shield door is unlocked (block 172). The timing may be set such that only one of the portal door and shield door may be open at a time in order to reduce the possibility of data from the RFID tags on the items in the bins or on the shelves from being read and errantly being associated with the employee or contractor. Video cameras mounted through the interior of the mobile tool facility monitor the employee's or contractor's activity. Once the employee or contractor has acquired the necessary items (block 174), he or she exits the mobile security portal (block 176) with the items. As the employee exits, the video cameras mounted on the portal may optionally capture an image of the employee with the items. The RFID reader system identifies the RFID tags that have been affixed or embedded within each item (block 178). The software system then updates the required inventory and employee records (block 180). The items are issued to the employee and adjustments are made to inventory levels to account for transactions.

Figure 12:
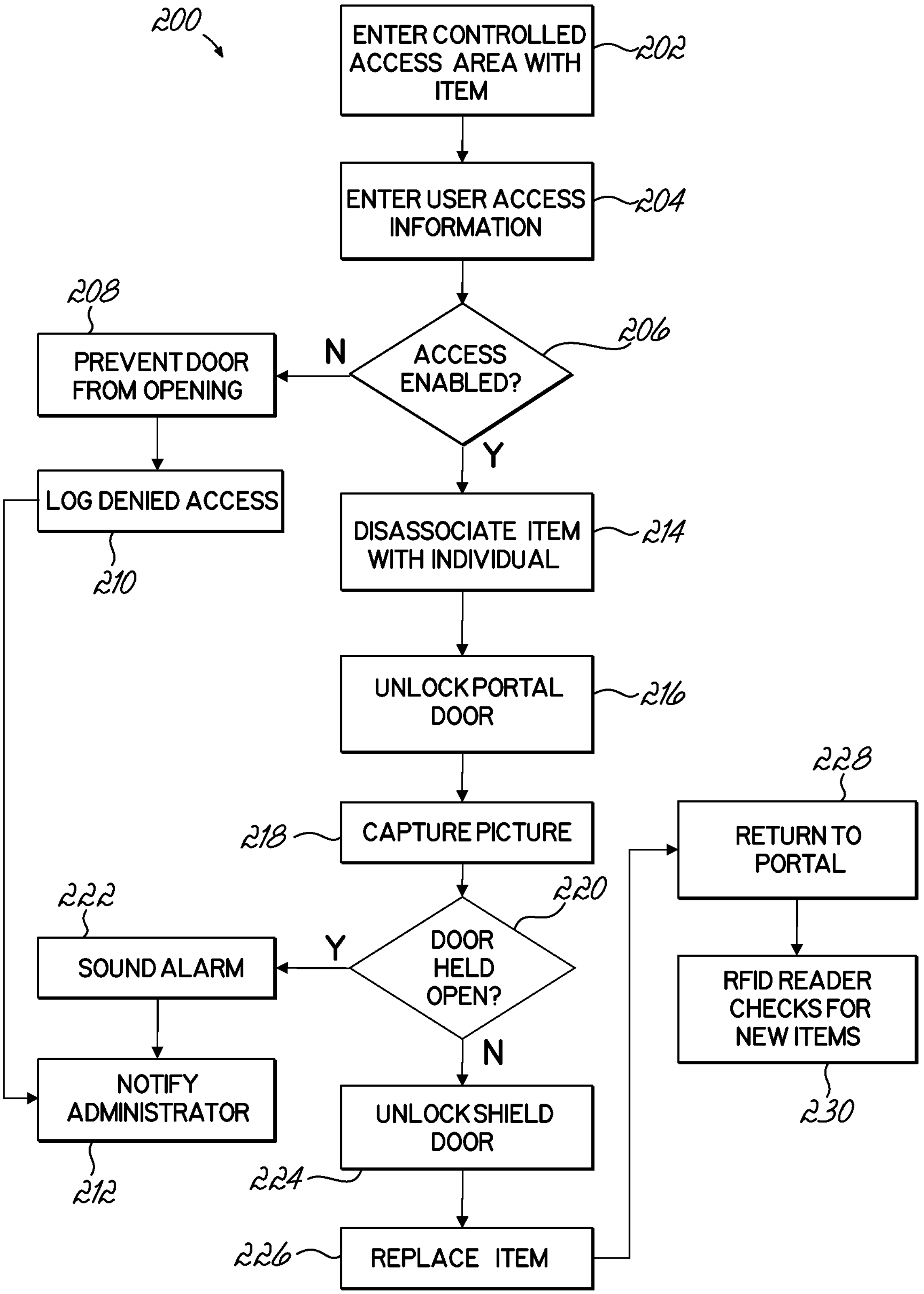
FIG. 12 is a flowchart illustrating an exemplary process of returning a tool to the mobile tool facility of FIG. 1.

Some items retrieved from the mobile tool facility may be disposable items and not necessarily assigned to the employee or contractor. The software system may simply update inventory levels when these items are removed. However, some of the items, such as the tools in FIGS. 6A and 6B are assigned to a specific employee or contractor and will need to eventually be returned to the mobile tool facility. An exemplary process for returning a tool is shown in flowchart 200 in FIG. 12. The employee or contractor enters the controlled access area with the item to return (block 202). Similar to the process above, the employee or contractor enters user information (block 204). Again, this may be accomplished using various methods. For example, the employee or contractor may enter a user ID and password on the console in order to gain access or in other embodiments, the employee or contractor may have a badge with an RFID tag including the user ID and password information. Again, one of ordinary skill in the art will appreciated that other methods of supplying user access information may also be used. If the employee or contractor is denied access ("No" branch of decision block 206), then the portal system prevents the door from opening. (block 208). The denied access with user name may be logged in a system log (block 210) and in some embodiments, an administrator may be informed that there was a denial of access (block 212). If access has been granted ("Yes" branch of decision block 206), the RF reader reads the identifying information from the item being returned, and the system software disassociates the item from the employee or contractor (block 214). The portal door is then unlocked (block 216). As the employee or contractor passes through the portal, a video surveillance system may capture and archive an image of the employee with the item being returned to establish time stamped visual documentation (block 218).

As the employee or contractor enters, an audible command is triggered to notify the employee or contractor to close the door. If the door is left disengaged or propped open ("Yes" branch of decision block 220), an audible alarm will be activated (block 222) and an electronic notification will be sent to management informing them of the door status (block 212). After a time delay, the shield door is unlocked (block 224). Again, the timing may be set such that only one of the portal door and shield door may be open at a time in order to reduce the possibility of data from the RFID tags on the items in the bins or on the shelves from being read and errantly being associated with the employee or contractor. Video cameras mounted through the interior of the mobile tool facility monitor the employee's or contractor's activity. Once the employee or contractor has returned the items (block 226), he or she returns to the mobile security portal (block 228). As the employee or contracto exits, the video cameras mounted on the portal may optionally capture an image of the employee or contractor. If the employee or contractor has acquired new items prior to exiting (block 230), these times are logged similar to the process set forth above in flowchart 150 in FIG. 11.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A mobile tool facility comprising:

a container configured to be moved to a plurality of locations, the container including an interior and a container end providing access to the interior;

a portal system rigidly coupled with the container, the portal system spaced from the container end to allow access to the portal system, the portal system operable to control access into and out of the container through the container end;

a radio frequency scanning area between the container end and a locking door;

a radio frequency shield wall positioned in the interior of the container and spaced from the portal system to allow access between the portal system and the shield wall, the shield wall configured to reduce an amount of electromagnetic energy entering the interior of the container; and a plurality of items stored in the interior of the container in a controlled space defined by the shield wall and interior walls of the container, the plurality of items being available to be removed from the container through the portal system by an authorized individual, wherein the portal system further comprises a radio frequency (RF) reader, the RF reader configured to read data from an RF identification tag (RFID tag) associated with an item of the plurality of items moving through the portal system, and wherein the radio frequency shield wall prevents the RF reader from erroneously detecting RFID tags on items within the container;

the radio frequency shield wall to prevent erroneous readings of items still located within the container;

the portal system further configured to secure the locking door while scanning the radio frequency scanning area for the item of the plurality of items as a user exits the interior of the container to verify replacement or removal of the at least one item; and automatically read data from the RFID data tag associated with the item and associate or disassociate the item from the user by the portal system.

2. The mobile tool facility of claim 1, wherein the container is a 53 foot semi-trailer or a 40 foot container box.

3. The mobile tool facility of claim 1, further comprising: an HVAC system, the HVAC system operable to control an environment on the inside of the container.

4. The mobile tool facility of claim 1, wherein the portal system comprises:

a top section having a first and a second end;

a first vertical section having a top end that is fixedly coupled to the first end of the top section, a second vertical section having a top end that is fixedly coupled to the second end of the top section, the first and second coupled vertical sections being designed to be placed at an access point of the controlled space, the first and second coupled vertical sections being further designed to form a portal area that the authorized individual enters and exits;

a computing device that is configured to track inventory stored in the controlled space, the computing device being housed in at least one of the first and second vertical sections; and wherein the locking door that engages the top, first and second vertical sections, the locking door being configured to prevent an unauthorized user from entering and exiting the controlled space, the locking door being coupled to the computing device, the computing device being configured to receive input from an individual at the portal area and unlock the locking door based on the received inputs from the individual.

5. The mobile tool facility of claim 4, further comprising:

a surrounding structure extending between the first and second vertical sections and contacting surfaces of the interior of the container filling any openings between the first and second vertical sections and the surfaces of the interior of the container;

wherein, the surrounding structure further directly contacts both the top section and a top surface of the interior of the container filling any openings between the top section and the top surface of the interior.

6. The mobile tool facility of claim 4, further comprising:

a first electromagnetic lock coupled to the locking door of the portal system; and a second electromagnetic lock coupled to a door of the shield wall, wherein, the computing device is configured to control a release of the first and second electromagnetic locks in response to the input from the individual.

7. The mobile tool facility of claim 1, further comprising: an antenna, positioned on an outer surface of the container, and configured to provide wireless internet access to the computing device.

8. The mobile tool facility of claim 1, further comprising: a camera system including at least one camera device configured to take a digital picture of the authorized individual upon entering or exiting the portal area, the at least one camera device mount to a first or second side of the portal device.

9. The mobile tool facility of claim 1 further comprising: an HVAC unit mounted on a wall opposite the container end, wherein the HVAC unit is configured to regulate the climate on the inside of the container.

10. The mobile tool facility of claim 1, wherein the container is a first container and includes side walls extending from the container end and a first side access door in one of the side walls positioned to allow access into and out of the controlled space, the mobile tool facility further comprising:

a second container including a container end, side walls extending from the container end, and a second side access door in one of the side walls, wherein the second container is positioned proximate the first container such that the first and second side access doors are essentially aligned, allowing authorized users access to the second container through the first and second side access doors without movement through one of the container ends.

11. A method of retrieving an item from a mobile tool facility including a container with an end and an interior to store a plurality of items and a portal system rigidly coupled with the container and spaced from the container end to define a controlled access area between the container end and the portal system, the method comprising:

detecting the presence of a user at the portal system;

receiving user access information with the portal system and determining if access should be granted to the user;

in response to access being granted to a user:

scanning the controlled access area for at least one of the plurality of items as the user removes the at least one item from the interior of the container;

shielding the controlled access area from the container with a radio frequency shield wall to prevent erroneous readings of items still located within the container; and automatically reading data from both a first RFID tag associated with a first item and a second RFID tag associated with a second item, and associating only the first item of a group consisting of the first item and the second item with the user by the portal system, wherein the second item is disposable.

12. The method of claim 11, further comprising:

in response to access being denied to the user:

preventing access to the interior of the container; and logging the denied access.

13. The method of claim 12, further comprising: capturing a picture of the user after determining if access should be granted to the user.

14. The method of claim 11, further comprising:

unlocking a door to allow access to the interior of the container; and in response to the door being held open for a set period of time, sounding an alarm.

15. A method of returning an item to a mobile tool facility including a container with an end and an interior to store a plurality of items and a portal system rigidly coupled with the container and spaced from the container end to define a controlled access area between the container end and the portal system, the method comprising:

detecting the presence of a user at the portal system entering a controlled access area of a container configured to be moved to a plurality of locations and having an interior to store a plurality of items;

receiving user access information with the portal system and determining if access should be granted to the user;

in response to access being granted to a user:

scanning the controlled access area for at least one of the plurality of items as the user enters the interior of the container to return the at least one item;

shielding the controlled access area from the container with a radio frequency shield wall having a lockable door to prevent erroneous readings of items still located within the container;

locking the lockable door while scanning the controlled access area for at least one of the plurality of items as the user exits the interior of the container to verify replacement of the at least one item; and at the portal system, automatically reading data from an RFID data tag associated with the at least one item and disassociating the at least one item from the user by the portal system.

16. The method of claim 14, further comprising:

capturing a picture of the user entering the portal system after being granted access.

17. The method of claim 15, further comprising:

unlocking a portal door to allow access to the interior of the container; and in response to the portal door being held open for a set period of time, sounding an alarm.

18. The mobile tool facility of claim 1, wherein a controlled access area is defined between the portal system and the end of the container such that the radio frequency shield wall separates the controlled space in the interior of the container from the controlled access area located beyond the end of the container, and wherein access into and out of the controlled access area is provided by a first locking door at the portal system and a second door at the radio frequency shield wall.

19. The method of claim 11, further comprising:

providing electrical power to the portal system and the container with an auxiliary power unit including a generator when another power supply is unavailable or inoperative.

20. The mobile tool facility of claim 1, wherein the shield wall comprises: an outer frame mounted to the container;

a shield panel including a screen layer, a first sheet layer and a second sheet layer, where the screen layer is disposed between the first and second sheet layers; and a door and a locking mechanism operably coupled to the door, where access through the shield wall is controlled by the locking mechanism.

* * * * *